United States Patent
Shimura

(10) Patent No.: US 10,061,307 B2
(45) Date of Patent: Aug. 28, 2018

(54) PRODUCTION ADJUSTMENT SYSTEM USING DISASTER INFORMATION

(71) Applicant: FANUC CORPORATION, Yamanashi (JP)

(72) Inventor: Yoshifumi Shimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 34 days.

(21) Appl. No.: 15/421,394

(22) Filed: Jan. 31, 2017

(65) Prior Publication Data

US 2017/0248939 A1 Aug. 31, 2017

(30) Foreign Application Priority Data

Feb. 25, 2016 (JP) ................. 2016-034775

(51) Int. Cl.
*G05B 19/418* (2006.01)

(52) U.S. Cl.
CPC .......... *G05B 19/4184* (2013.01); *G05B 2219/33315* (2013.01); *Y02P 90/02* (2015.11); *Y02P 90/30* (2015.11)

(58) Field of Classification Search
CPC ....... G05B 19/4184; Y02P 90/02; Y02P 90/30
See application file for complete search history.

(56) References Cited

U.S. PATENT DOCUMENTS

| 2007/0144242 A1* | 6/2007 | Matsumiya | G01V 1/008 73/82 |
| 2016/0077654 A1* | 3/2016 | Ishikawa | G06F 3/0488 345/174 |

FOREIGN PATENT DOCUMENTS

| JP | 2004-334492 A | 11/2004 |
| JP | 2009-283580 A | 12/2009 |
| JP | 5037372 B2 | 9/2012 |
| JP | 2013-184283 A | 9/2013 |
| JP | 2014-66664 A | 4/2014 |

* cited by examiner

*Primary Examiner* — Mark Connolly
(74) *Attorney, Agent, or Firm* — Hauptman Ham, LLP

(57) ABSTRACT

A production adjustment system includes a cell including a plurality of machines, a cell control device which is communicably connected to the cell, to control the cell, and a higher-level management controller which is communicably connected to the cell control device, to acquire disaster information. The cell control device includes a command unit for issuing commands to the plurality of machines based on state information of the cell, which is acquired from the at least one sensor of the cell, and disaster information acquired from the higher-level management controller.

11 Claims, 3 Drawing Sheets

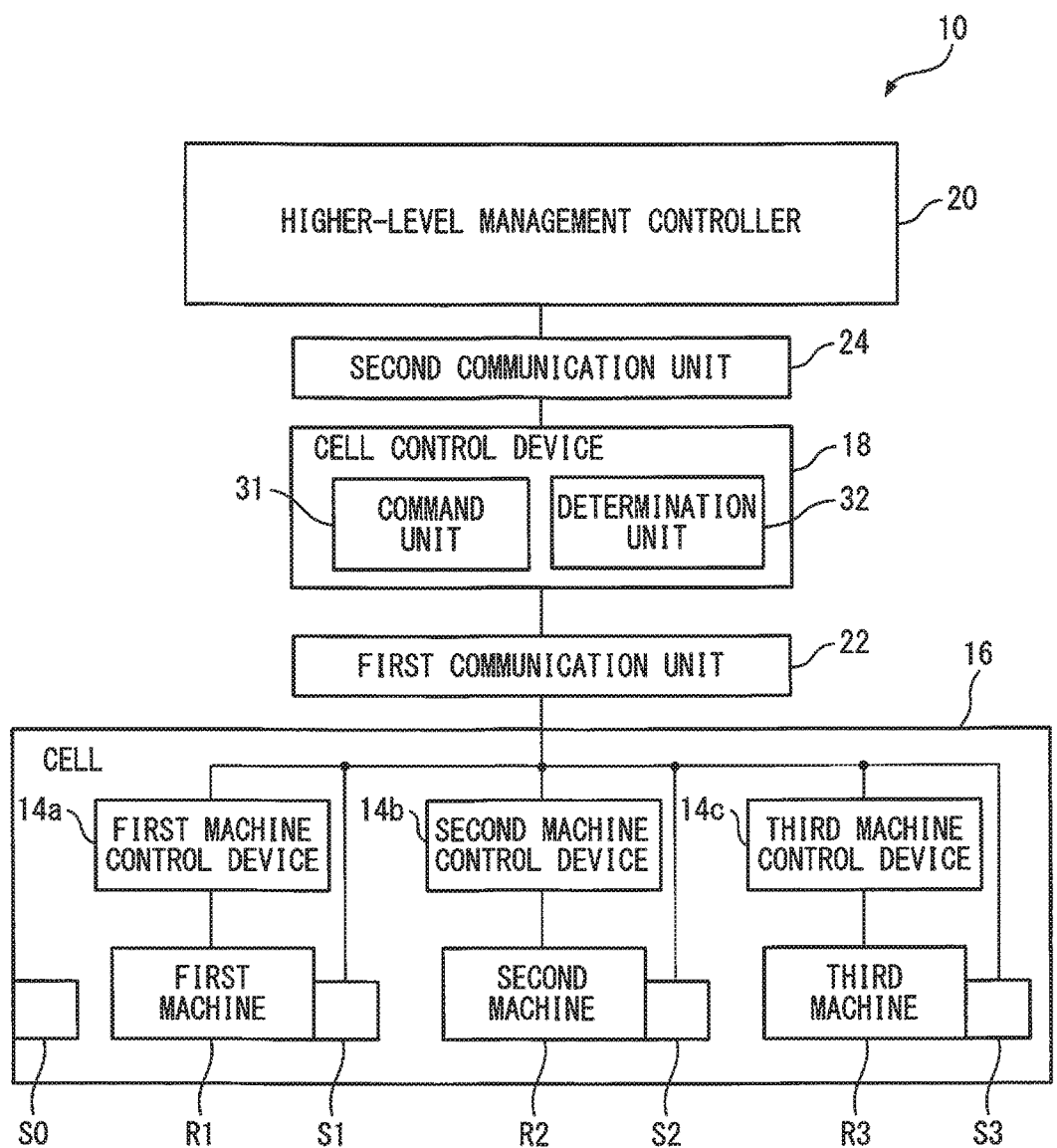

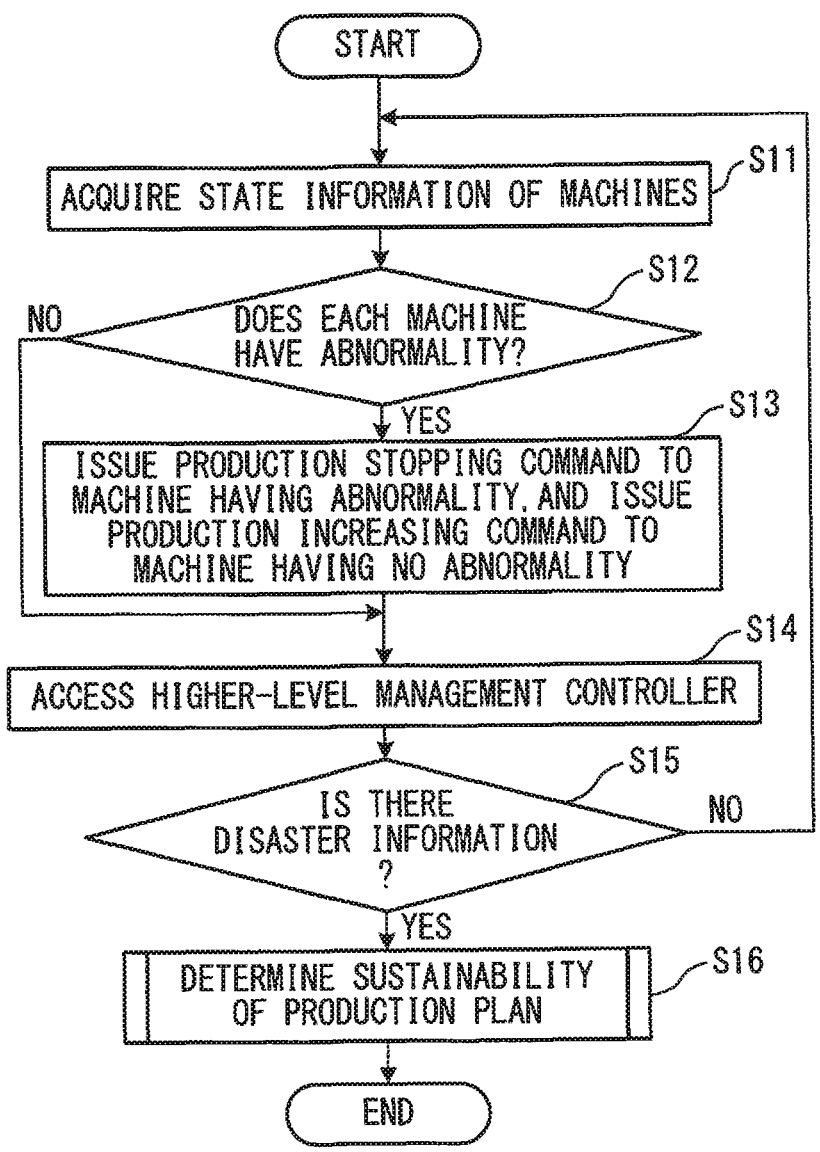

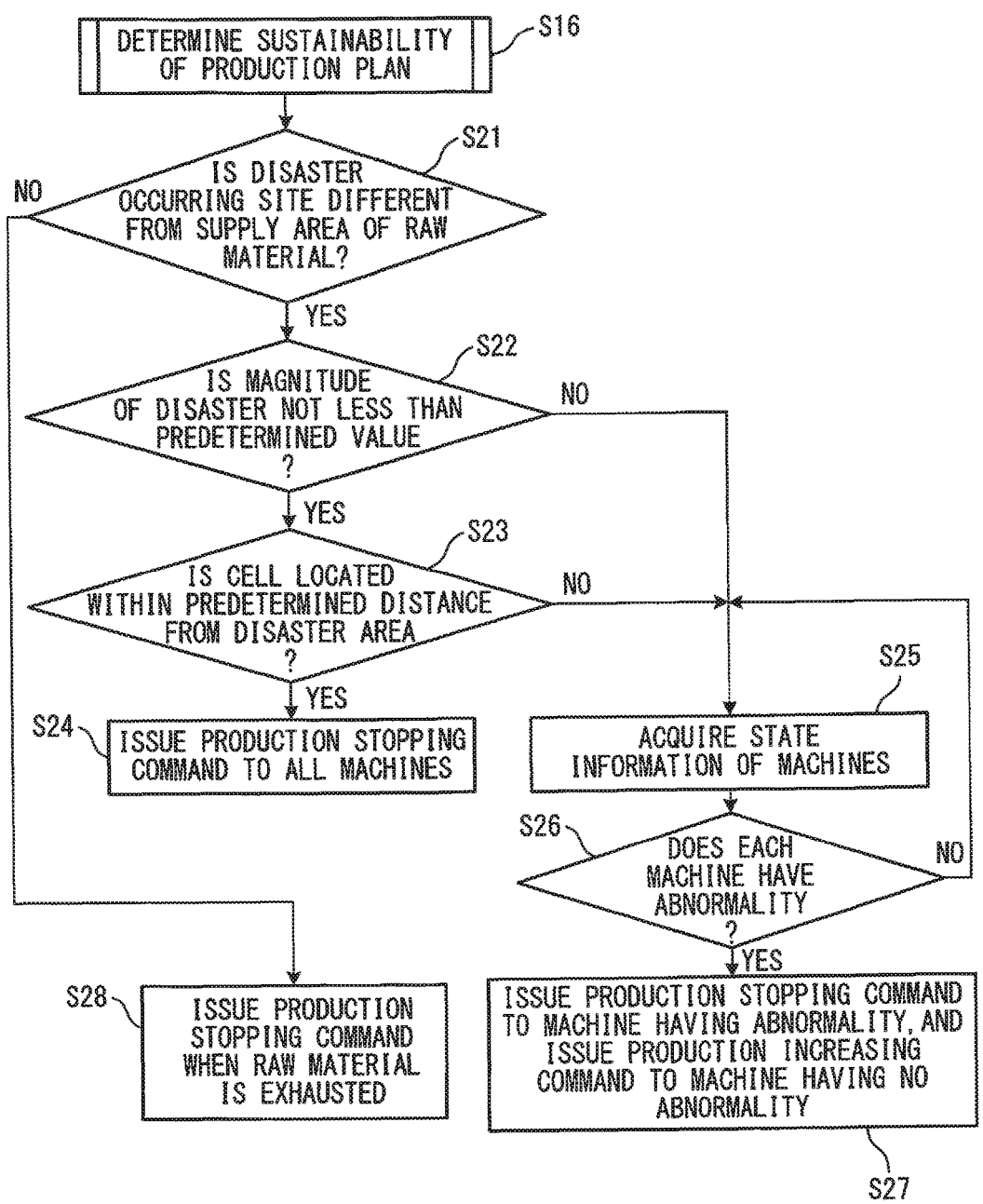

PRODUCTION ADJUSTMENT SYSTEM USING DISASTER INFORMATION

RELATED APPLICATIONS

The present application claims priority to Japanese Patent Application Number 2016-034775 filed Feb. 25, 2016, the disclosure of which is hereby incorporated by reference herein in its entirety.

BACKGROUND OF THE INVENTION

1. Field of the Invention

The present invention relates to a production adjustment system for adjusting production in a cell, particularly, a production adjustment system using disaster information.

2. Description of the Related Art

When a disaster, such as an earthquake, occurs, a numerical control device and machines controlled by the numerical control device are broken in some cases. The broken machines may damage workpieces, or may cause human sufferings. Thus, when a disaster occurs, an operator manually stops the program operation of each machine, which is executed by the numerical control machine.

When the operator manually stops each machine, the stopping of the machine is delayed in some cases. In such a case, the machine or workpieces cannot be prevented from being damaged. Thus, Japanese Patent No. 5037372 discloses a numerical control device which can automatically stop the program operation or escape tools, using earthquake information.

SUMMARY OF THE INVENTION

Japanese Patent No. 5037372 discloses that a single numerical control device receives earthquake information, and stops the corresponding machines. However, the same kind or different kinds of machines are usually installed in a factory. Thus, the fact that each of the numerical control devices corresponding to the machines receives earthquake information, complicates the entire configuration of the system, and increases the cost.

When an abnormality occurs in a machine, the numerical control device in Japanese Patent No. 5037372 cannot stop the machine.

The present invention was made in light of the circumstances described above and has an object to provide a simple production adjustment system for issuing production commands to a plurality of machines based on disaster information from the outside and inside information of the machines.

To achieve the above object, according to a first aspect of the invention, there is provided a production adjustment system that includes a cell including a plurality of machines, a plurality of machine control devices for controlling the plurality of machines, and at least one sensor, a cell control device which is communicably connected to the cell, to control the cell, and a higher-level management controller which is communicably connected to the cell control device, to acquire disaster information. The cell control device includes a command unit for issuing commands to the plurality of machines based on state information of the cell, which is acquired from the at least one sensor of the cell, and disaster information acquired from the higher-level management controller.

According to a second aspect of the invention, in the production adjustment system according to the first aspect of the invention, when the higher-level management controller acquires the disaster information, the command unit determines whether an abnormality occurs in each of the plurality of machines, based on the state information of the cell, and issues a command to each of the plurality of machines.

According to a third aspect of the invention, in the production adjustment system according to the first or second aspect of the invention, the state information of the cell includes at least one of the deviation, speed, acceleration, load condition, temperature, alarm information, and vibration condition of the plurality of machines, or the vibration condition, temperature, humidity, and power source condition of the cell.

According to a fourth aspect of the invention, in the production adjustment system according to any of the first to third aspects of the invention, the command unit issues, in real time, a command regarding at least one of the speed, current, and torque of the plurality of machines.

According to a fifth aspect of the invention, in the production adjustment system according to the first aspect of the invention, the cell control device includes a determination unit for determining the sustainability of production plans for the plurality of machines based on the disaster information, and the command unit issues a command to each of the plurality of machines based on the sustainability of production plans, which is determined by the determination unit.

According to a sixth aspect of the invention, in the production adjustment system according to the fifth aspect of the invention, the determination unit determines that a machine selected from among the plurality of machines, in which a supply area of a raw material of a product to be produced coincides with a disaster occurring site included in the disaster information, has no sustainability of the production plan, and the command unit issues a production stopping command to the detected machine.

According to a seventh aspect of the invention, in the production adjustment system according to the sixth aspect of the invention, the command unit transmits a production stopping command to the detected machine until the supply area of the raw material is changed to another area different from the disaster occurring site.

These objects, features, and advantages of the present invention and other objects, features, and advantages will become further clearer from the detailed description of typical embodiments illustrated in the appended drawings.

BRIEF DESCRIPTION OF THE DRAWINGS

FIG. 1 is a block diagram of a production adjustment system based on the present invention.

FIG. 2 is a flowchart of the operation of a production adjustment system.

FIG. 3 is a flowchart of determination of the sustainability of production plans.

DETAILED DESCRIPTION

Embodiments of the present invention will be described below with reference to the accompanying drawings. In the following figures, similar members are designated with the same reference numerals. These figures are properly modified in scale to assist the understanding thereof.

FIG. 1 is a block diagram of a production adjustment system based on the present invention. A production adjustment system 10 is provided with a cell 16 including at least one, preferably, a plurality of machines (three machines in the illustrated example) R1 to R3 and one or more machine control devices (numerical control devices) 14a to 14c (the number of which is usually equal to the number of the machines) for controlling the machines R1 to R3, a cell control device (cell controller) 18 configured to communicate with the machine control devices 14a to 14c, and a higher-level management controller 20 configured to communicate with the cell control device 18. The machine control devices 14a to 14c respectively control the machines R1 to R3, and transmit data measured in the machines to the cell control device 18.

The cell 16 is a set of a plurality of machines for performing predetermined operations. Examples of the machines R1 to R3 include machine tools, articulated robots, parallel link robots, manufacturing machines, industrial machines, etc. The machines may be comprised of the same kind of machines, or different kinds of machines.

In FIG. 1, sensors S1 to S3 are respectively attached to the machines R1 to R3. The sensors S1 to S3 detect, as state information, at least one of the deviation, speed, acceleration, load condition, alarm information, temperature, and vibration condition of the machines R1 to R3. In addition, a sensor S0 is disposed in the cell 16. The sensor S0 detects, as state information, at least one of the vibration condition, temperature, humidity, and power source condition of the cell 16.

Note that, in the present invention, the cell 16 can be installed in, for example, a factory for manufacturing products, whereas the cell control device 18 and the higher-level management controller 20 can be installed in, for example, a building different from the factory. In this instance, the cell control device 18 and the machine control devices 14a to 14c can be connected via a network, such as an intranet (first communication unit 22). The higher-level management controller 20 can be installed in, for example, an office away from the factory. In this instance, the higher-level management controller 20 can be communicably connected to the cell control device 18 via a network, such as the Internet (second communication unit 24). However, this is merely an example. Any communication unit, which communicably connects the cell control device 18 and the machine control devices 14a to 14c, can be adopted as the first communication unit 22. Any communication unit, which can communicably connect the cell control device 18 and the higher-level management controller 20, can be adopted as the second communication unit 24.

The cell control device 18 is configured to control the cell 16, specifically, can transmit various commands to the machine control devices 14a to 14c, and can respectively acquire, for example, the operation conditions (including the aforementioned data) of the machines R1 to R3 from the machine control devices 14a to 14c.

As shown in FIG. 1, the cell control device 18 receives the state information of the cell 16, which is detected by the sensors S0 to S3, via the first communication unit 22, and acquires disaster information, which is received by the higher-level management controller 20, via the second communication unit 24. The cell control device 18 includes a command unit 31 for issuing commands to the machines R1 to R3 based on the state information of the cell 16 and the disaster information. Specifically, the command unit 31 issues, in real time, a command or commands regarding at least one of the speed, current, and torque of the machines R1 to R3.

The cell control device 18 also includes a determination unit 32 for determining the sustainability of production plans for the machines R1 to R3 based on the disaster information.

The determination unit 32 can also determine abnormalities in the machines R1 to R3 based on the state information, and both the state information and the disaster information, as will be described later.

The higher-level management controller 20 is, for example, a personal computer, and receives the disaster information through various networks. The disaster information is all the information regarding disasters, and includes sites at which disasters occur. Examples of disasters include tsunami, earthquake, eruption, weather, and typhoon, and additionally, human factors, such as fire, explosion, terrorism, etc. In such disaster information, the magnitude of a disaster is defined by a plurality of scales for each kind of disaster.

FIG. 2 is a flowchart of the operation of a production adjustment system based on the present invention. The operation of the production adjustment system 10 will be described below with reference to the drawings. The operations shown in FIG. 2 are repeated at a predetermined control cycle.

Note that the production plan to be executed in the cell 16 is preset by the higher-level management controller 20. When step S11 in FIG. 2 is executed, the machine control devices 14a to 14c respectively control the machines R1 to R3 based on the production plan. The sensors S0 and S1 to S3 detect the state information at a predetermined time interval. The higher-level management controller 20 always receives the disaster information from the outside.

First, in step S11, the cell control device 18 acquires state information from the sensors S0 and S1 to S3 in the cell 16. Then, in step S12, the determination unit 32 of the cell control device 18 determines whether an abnormality occurs in each of the machines R1 to R3, based on the state information acquired by the sensors S1 to S3. Note that a threshold value is preset in accordance with each piece of the state information. The determination unit 32 compares the state information with the threshold value corresponding to the state information, to determine the occurrence of an abnormality in each of the machines R1 to R3. When it is determined that all the machines R1 to R3 have no abnormality, the process shifts to step S14.

By contrast, when it is determined that at least one machine has an abnormality, the command unit 31 of the cell control device 18 issues, in step S13, a production stopping command to the machine having the abnormality. In this instance, the command unit 31 issues a production increasing command to machines having no abnormality at the same time, to compensate for reduction in yield in the cell 16. Of course, when it is determined that all the machines R1 to R3 have abnormalities, the command unit 31 issues production stopping commands to all the machines R1 to R3.

In step S12, the determination unit 32 may determine whether an abnormality occurs in the cell 16 based on the state information acquired by the sensor S0. When it is determined that an abnormality occurs in the cell 16, the command unit 31 issues production stopping commands to all the machines R1 to R3.

Subsequently, in step S14, the cell control device 18 accesses the higher-level management controller 20. When the higher-level management controller 20 does not receive disaster information, the process returns to step S11, and repeats the operations. When the higher-level management controller 20 receives disaster information, the process shifts to step S16, and the determination unit 32 determines whether the preset production plan is sustainable.

FIG. 3 is a flowchart to determine the sustainability of production plans. In step S21, the determination unit 32 extracts a disaster occurring site from among the disaster information. Regarding workpieces to be processed in the machines R1 to R3 and materials to be supplied to the machines R1 to R3 (hereinafter simply referred to as "raw materials"), supply areas (production sites) of the raw materials are preset. In step S21, whether the disaster occurring site is different from each supply area is determined.

When the disaster occurring site coincides with the supply area of the row material specified for a given machine, the determination unit 32 determines that the production plan for the machine is not sustainable. In this instance, the process shifts to step S28, and the command unit 31 issues a production stopping command to the machine. Note that the production stopping command is issued after the currently used raw material is exhausted. When the higher-level management controller 20 changes the supply area of the raw material to another area different from the disaster occurring site, the command unit 31 cancels the production stopping command, and returns the same to a usual production command.

Note that, when the supply areas of the raw materials for all the machines coincide with the disaster occurring site in step S21, the determination unit 32 determines that the production plans for all the machines are not sustainable. In this instance, the command unit 31 issues production stopping commands to all the machines R1 to R3.

Regarding other machines in which the disaster occurring site coincides with the supply areas of the raw materials, the determination unit 32 determines, in step S22, whether the magnitude of the disaster is not less than a predetermined value, based on the disaster information. When the magnitude of the disaster is not less than the predetermined value, the process shifts to step S23. When the magnitude of the disaster is less than the predetermined value, the process shifts to step S25.

In step S23, the determination unit 32 determines whether the cell 16 is located within a predetermined distance from the disaster occurring site. When the cell 16 is located within the predetermined distance from the disaster occurring site, the process shifts to step S24. In this instance, it is determined that a disaster having a predetermined magnitude or greater occurs within a short distance from the cell 16, and the command unit 31 issues production stopping commands to all the machines R1 to R3.

When the cell 16 is not located within the predetermined distance from the disaster occurring site, the process shifts to step S25. In step S25, as in step S11, the cell control device 18 acquires state information from the sensors S0 and S1 to S3 in the cell 16. In step S26, as in step S12, whether an abnormality occurs in each of the machines R1 to R3 is determined based on each piece of the state information acquired by the sensors S0 and S1 to S3. When an abnormality occurs in at least one machine, the process shifts to step S27. When no abnormality occurs in all the machines R1 to R3, the process returns to step S25.

In step S27, as in step S13, the command unit 31 issues a production stopping command to a machine having an abnormality, and issues production increasing commands to machines having no abnormality. This compensates for reduction in yield in the cell 16. As seen above, in the present invention, a production stopping command is issued depending on the magnitude of the disaster and the distance between the cell 16 and the disaster occurring site. In other words, even when a disaster occurs, a production stopping command is not necessarily issued. Thus, the present invention enables an appropriate production adjustment.

As seen above, in the present invention, the single cell control device 18 collects the disaster information from the outside and the state information of the cell 16, and issues commands to the machines R1 to R3 based on these pieces of the information. Thus, when a disaster occurs, a production adjustment is performed so that some of the machines automatically and rapidly stop. This prevents damages caused by the disaster from spreading, and enables improvement of the quality of workpieces to be processed by the machines. Alternatively, a production decreasing command may be issued in place of the production stopping command. This will enable a more appropriate production adjustment. Alternatively, the configuration of the production adjustment system 10 can be simplified.

Effect of the Invention

In the present invention, the single cell control device collects the disaster information from the outside and the state information of the cell, and issues commands to the machines. Thus, when a disaster occurs, some of the machines rapidly stop to prevent damages from spreading, and enables improvement of the quality of workpieces. Further, the entirety of the system can be simplified.

The present invention has been described above using exemplary embodiments. However, a person skilled in the art would understand that the aforementioned modifications and various other modifications, omissions, and additions can be made without departing from the scope of the present invention.

What is claimed is:

1. A production adjustment system comprising:
a cell including a plurality of machines, a plurality of machine control devices for controlling the plurality of machines, and at least one sensor;
a cell control device which is communicably connected to the cell, to control the cell; and
a higher-level management controller which is communicably connected to the cell control device, to acquire disaster information, wherein
the cell control device includes a command unit for issuing commands to the plurality of machines based on state information of the cell, which is acquired from the at least one sensor of the cell, and disaster information acquired from the higher-level management controller;
the cell control device further includes a determination unit for determining the sustainability of production plans for the plurality of machines based on the disaster information;
wherein the command unit issues commands to the plurality of machines based on the sustainability of production plans determined by the determination unit; and
wherein if the determination unit determines that the cell is located within a predetermined distance from a disaster occurring site, the command unit issues production stopping commands to all of the plurality of machines.

2. The production adjustment system according to claim 1, wherein, when the higher-level management controller acquires the disaster information, the command unit determines whether an abnormality occurs in each of the plurality of machines, based on the state information of the cell, and issues a command to each of the plurality of machines.

3. The production adjustment system according to claim 1, wherein the state information of the cell includes at least one of the deviation, speed, acceleration, load condition, alarm information, temperature, and vibration condition of the plurality of machines, or the vibration condition, temperature, humidity, and power source condition of the cell.

4. The production adjustment system according to claim 1, wherein the command unit issues, in real time, a command regarding at least one of the speed, current, and torque of the plurality of machines.

5. The production adjustment system according to claim 1, wherein the determination unit determines that a machine selected from among the plurality of machines, in which a supply area of a raw material of a product to be produced coincides with a disaster occurring site included in the disaster information, has no sustainability of the production plan, and
the command unit issues a production stopping command to the selected machine.

6. The production adjustment system according to claim 5, wherein the command unit issues a production stopping command to the selected machine until the supply area of the raw material is changed to another area different from the disaster occurring site.

7. A production adjustment system comprising:
a cell including a plurality of machines, a plurality of machine control devices for controlling the plurality of machines, and at least one sensor;
a cell control device which is communicably connected to the cell, to control the cell; and
a higher-level management controller which is communicably connected to the cell control device, to acquire disaster information, wherein
the cell control device includes a command unit for issuing commands to the plurality of machines based on state information of the cell, which is acquired from the at least one sensor of the cell, and disaster information acquired from the higher-level management controller;
the cell control device further includes a determination unit for determining the sustainability of production plans for the plurality of machines based on the disaster information;
wherein the command unit issues commands to the plurality of machines based on the sustainability of production plans determined by the determination unit; and
wherein the determination unit determines that a machine selected from among the plurality of machines, in which a supply area of a raw material of a product to be produced coincides with a disaster occurring site included in the disaster information, has no sustainability of the production plan, and
the command unit issues a production stopping command to the selected machine.

8. The production adjustment system according to claim 7, wherein, when the higher-level management controller acquires the disaster information, the command unit determines whether an abnormality occurs in each of the plurality of machines, based on the state information of the cell, and issues a command to each of the plurality of machines.

9. The production adjustment system according to claim 7, wherein the state information of the cell includes at least one of the deviation, speed, acceleration, load condition, alarm information, temperature, and vibration condition of the plurality of machines, or the vibration condition, temperature, humidity, and power source condition of the cell.

10. The production adjustment system according to claim 7, wherein the command unit issues, in real time, a command regarding at least one of the speed, current, and torque of the plurality of machines.

11. The production adjustment system according to claim 7, wherein the command unit issues a production stopping command to the selected machine until the supply area of the raw material is changed to another area different from the disaster occurring site.

* * * * *